United States Patent [19]
Torrents

[11] 3,872,531
[45] Mar. 25, 1975

[54] DEVICE FOR CONTINUOUS HALF-AUTOMATIC PRODUCTION OF CORK SOLES FOR FOOTWEARS

[76] Inventor: Eduardo Torrents, Via Isorni 14, 21040 Morazzone, Italy

[22] Filed: Nov. 26, 1973

[21] Appl. No.: 418,820

[30] Foreign Application Priority Data
Nov. 24, 1972 Italy .................................. 32065/72

[52] U.S. Cl. ................................................. 12/1 A
[51] Int. Cl. ..................................................... A43d
[58] Field of Search .............. 12/1 R, 1 A, 52, 18.1, 12/146 R, 146 B

[56] References Cited
UNITED STATES PATENTS

| | | | |
|---|---|---|---|
| 2,473,024 | 6/1949 | Gregg.................................. | 12/146 B |
| 3,077,619 | 2/1963 | Hidden et al. .......................... | 12/1 A |
| 3,751,744 | 8/1973 | Valasek et al. ........................ | 12/1 A |

*Primary Examiner*—Patrick D. Lawson
*Attorney, Agent, or Firm*—Michael S. Striker

[57] ABSTRACT

A device for continuous half-automatic production of cork soles for footwears, provided with a core consisting of thermoplastic material, obtained by injection of thermoplastic material between the two edges of the plant.

9 Claims, 13 Drawing Figures

Fig. 3 bis

DEVICE FOR CONTINUOUS HALF-AUTOMATIC PRODUCTION OF CORK SOLES FOR FOOTWEARS

This invention relates to a device for continuous half-automatic production of cork soles for footwears.

More particularly, this invention relates to a device for continuous half-automatic production of cork soles for footwears, provided with a core, consisting of plastic material, obtained from injection moulding.

As well known, footwears are generally provided at the foot arc with a suitably arcuated portion, having an appropriate rigidity.

Said arcuate portion is normally stiffened by means of a leather strip or a metal blade in order to serve as a support means for the foot arc.

Obtaining such arcuated and stiffened portion requires in practice considerable time and labour for both fastening of the stiffening member to the upper face of the soles and subsequent covering of the soles themselves with the cork sole.

Furthermore, the rigidity of said members is in practice rather relative, just in view of the intimate characteristics of the materials from which they are obtained.

It is an object of this invention to provide either an automatic or half-automatic device producing in a continuous operation cork soles for footwears not showing the above outlined inconveniences.

It is another object of this invention to provide either an automatic or half-automatic device producing in a continuous operation cork soles for footwears, having a rigid core, consisting of plastic material, and adapted to be fitted the shoe soles direct.

These and further object, which will become more apparent from the following detailed description, are attained through a device, made up of a series of radially arranged moulds, lying at an equal distance from each other, on a horizontal table, showing a circular shape and likely to rotate "tripwise."

Inside said moulds there is placed a plant having the shape of the foot and consisting of a cardboard strip or other sheet material, adapted for the specific purpose, and having a convenient thickness.

The aforesaid plant is being formerly longitudinally cut only at its rear half and shows in the lower edge obtained in this manner a centrally positioned through-hole.

Through said there is injected between the two edges of the plant, enclosed in the mould, a suitable synthetic resin, which after hardening imparts to the rear portion of the plant itself a suitable shape and rigidity.

The aforementioned moulds, consisting of two portions, adhering to each other by superposition, are connected to specially provided mould holders, showing a rectangular shape, which are journalled therebetween at one of their smaller sides, being therefore likely to be opened like a book.

Said mould holders, disposed radially on the peripheric part of the rotary table, appear in a succession order ahead of an operator, who load them by hand with a pair of plants. The mould and the mould holder are provided both with a cylindrical hole, corresponding to that drilled on the lower edge of the plant.

The mould holder re-closes automatically and is longitudinally moved a length of its circular trajectory until reaching an injection apparatus.

The latter is partially oscillating in a vertical plane and provided with a pair of nozzles, which insert themselves into the two cylindrical holes of the mould holders and mould as well.

The number of the mould holders, arranged on the rotary table is such that at the end of each full revolution of the table itself, the plastic material, injected in molten condition between the two edges of the plant is perfectly shaped and solidified.

At the end of each full revolution the mould holder opens automatically, ejecting the pair of shaped and stiffened plants, is thus ready ahead of the operator to be loaded again.

According to a preferred practical embodiment form, the device of this invention is provided with twelve mould holding members, being regularly spaced from each other along the edge of the rotary table.

Said mould holders enclose so many moulds of increasing dimensions according to the sizes being conventionally used in the shoe manufacture.

The same device is provided with a shelf with support surfaces being movable upwardly, which are moved trip-wise by a suitable ratchet gear, being actuated in turn by the subsequent trips of the rotary table.

On each of said support surfaces there are placed, according to conventional increasing sizes, the plants to be disposed pair-wise in the moulds.

In the manner, the operator has always within his reach the plants corresponding to the dimensions of each individual mould.

The shaped cork soles, ejected by the moulds themselves, fall onto a belt conveyor, disposed tangentially to the rotary table and are conveyed onto a second belt conveyor, placed orthogonally to the former.

The latter belt conveyor carries arranged side-by-side twelve containers or, generally speaking, so many contained as the moulds mounted on the rotary table, and is provided with so many deviating members.

The latter consist of a horizontal arm, which my move up and down until coming in contact with the belt conveyor itself as a result of the action of a selector, provide with a series of cams, which by rotating act on so many pneumatic push-button valves.

The displacements of the table supporting the mould holders are determined essentially by a Maltese cross mechanism the driving rotation of which is actuated by a speed reducing unit.

Furthermore, the device according to the present invention, is provided with a positioning group for the aforesaid table, which maintains it locked during the loading time of the individual moulds.

These and further characteristic features of a functional and constructional nature of the device of this invention for continuous production of rigid and shaped cork soles will be better understood from the following detailed description taken in conjunction with the accompanying drawings, in which.

Referring now particularly to the numeral symbols in the various figures on the accompanying drawings, the device of this invention for continuous production of cork soles is made up of a baseplate 1 to which there is fixedly secured a vertical column 2, provided with a shoulder 3 on which rests through a thrust bearing 4 a table 5 which may rotate and showing a circular shape.

Along the edge of said rotary table 5 there are fastened according to a radial arrangement, preferably twelve mould holders, consisting of two rectangular structures 6 and 6', journalled for movement in the supports 7 via two pins 8 and 8', provided at their median portion with a pair of gears 9 and 9' joining each other.

Within the two parts 6 and 6' of the mould holder there are placed the two mould halves 10 and 10', showing the shape to be given the pair of plants 11.

Figures 9, 11, 12:
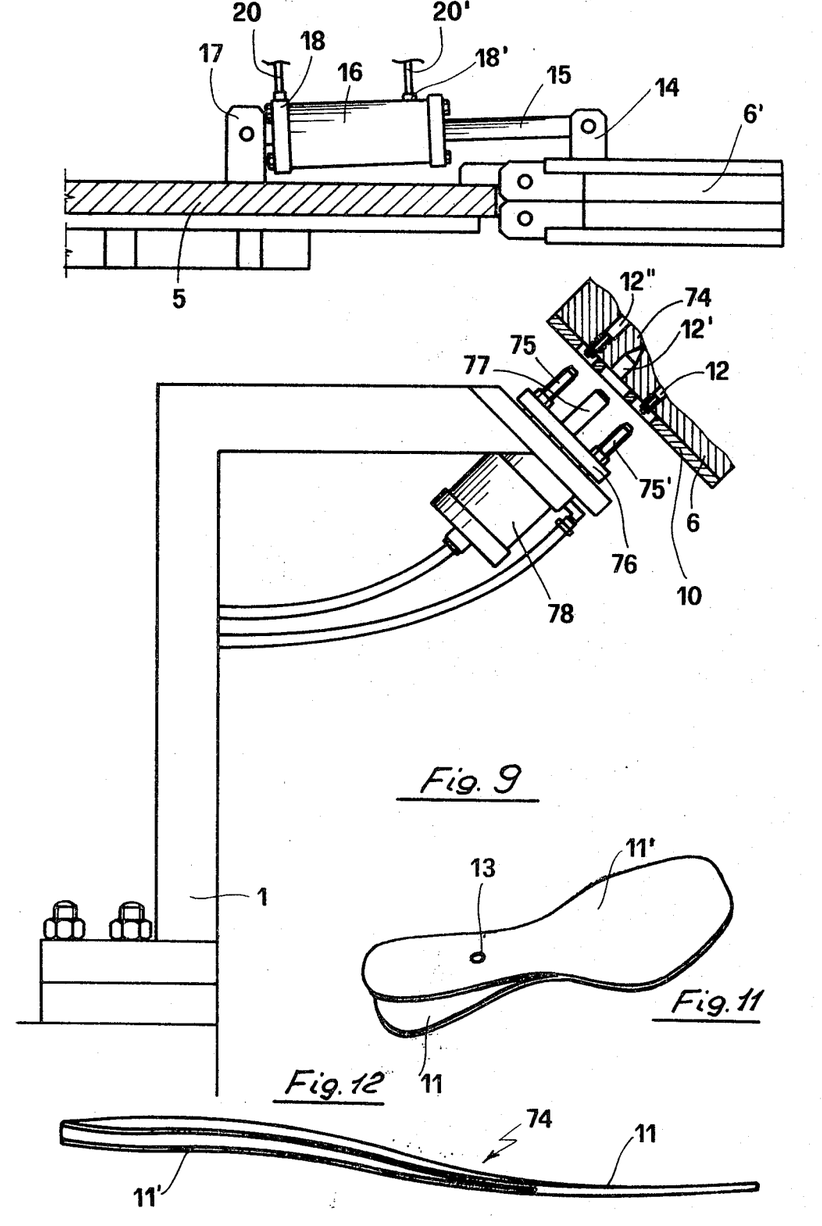
FIG. 9 represents in a schematical form the detail of the mould formed cork sole stripping group.
FIG. 11 shows in a perspective form a cut plant, ready to be inserted into the mould.
FIG. 12 represents the vertical section of the cork sole obtained by the instant device.

The two lower mould halves 10 and mould holder 6 are provided, axially as may be seen in FIG. 9, relative to the shape of each cork sole, with three through-holes 12, 12' and 12'' the median hole 12' of which is slightly projecting from the plans of the mould itself.

To the edge of said median hole 12' fastens via the opening 13 provided in the lower edge 11' of the plant 11 the plant itself to the mould.

The upper part 6' of the mould holder is journalled via the support 14 to the piston 15 of a double acting cylinder 16, which determines the opening and the closing of the mould holder itself.

Said double acting cylinder 16 is journalled in turn via the support 17 to the rotary table 5 and actuated through a fluid, sent at its ends 18 and 18' by a distributing group 19 through the lines 20 and 20'.

The aforementioned distributing group 19 is also supported by the column 2 through the thrust bearing 21 and is made integral with the rotary table 5 via the rod 22.

The device of this invention includes further an injection apparatus 23, placed sideways of the rotary table 5 and journalled by means of the pin 24 to the fork 25, integral with the baseplates 1.

Figure 1:
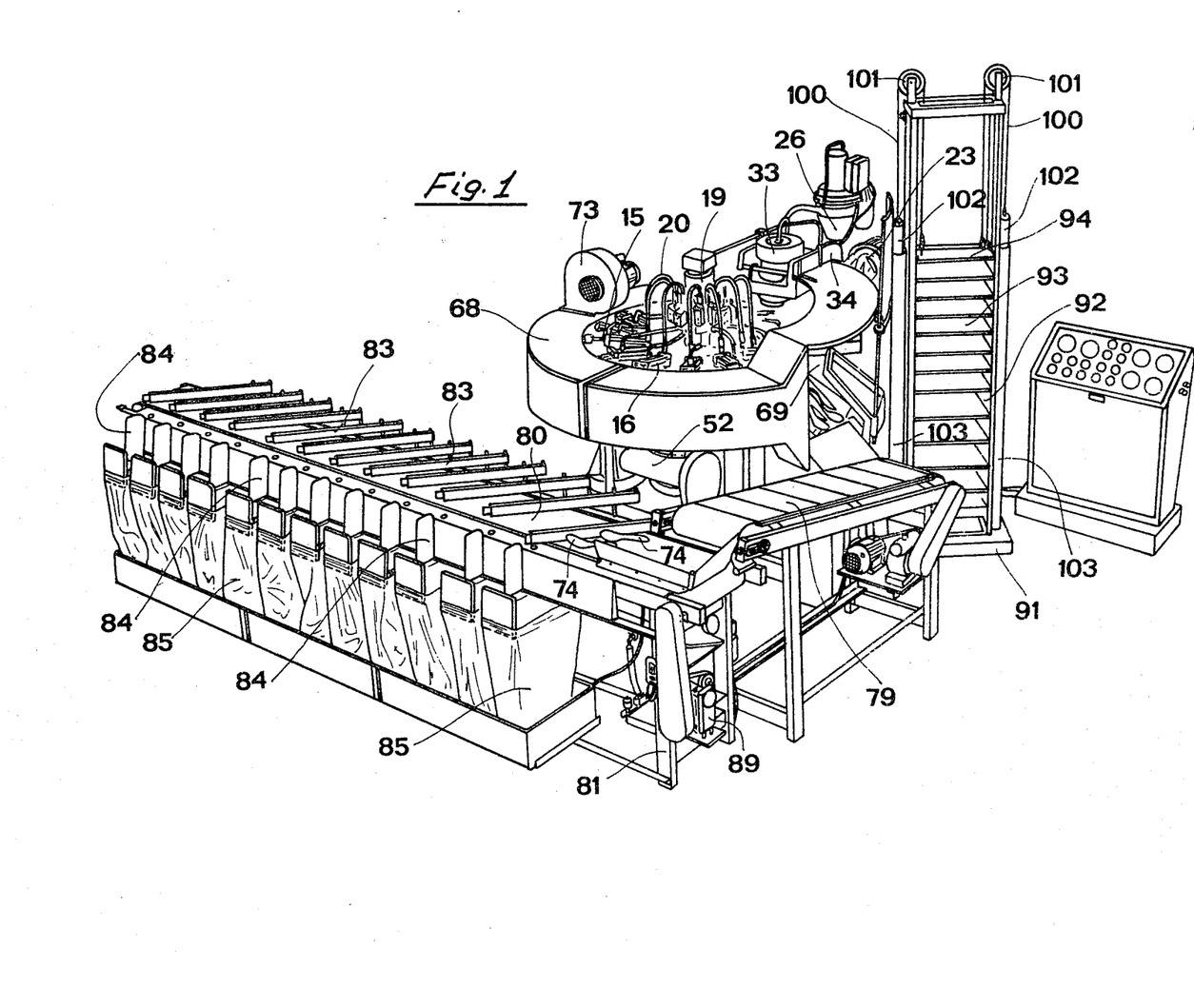
FIG. 1 represents in a schematical perspective view the device of this invention as a whole.
Figure 2:
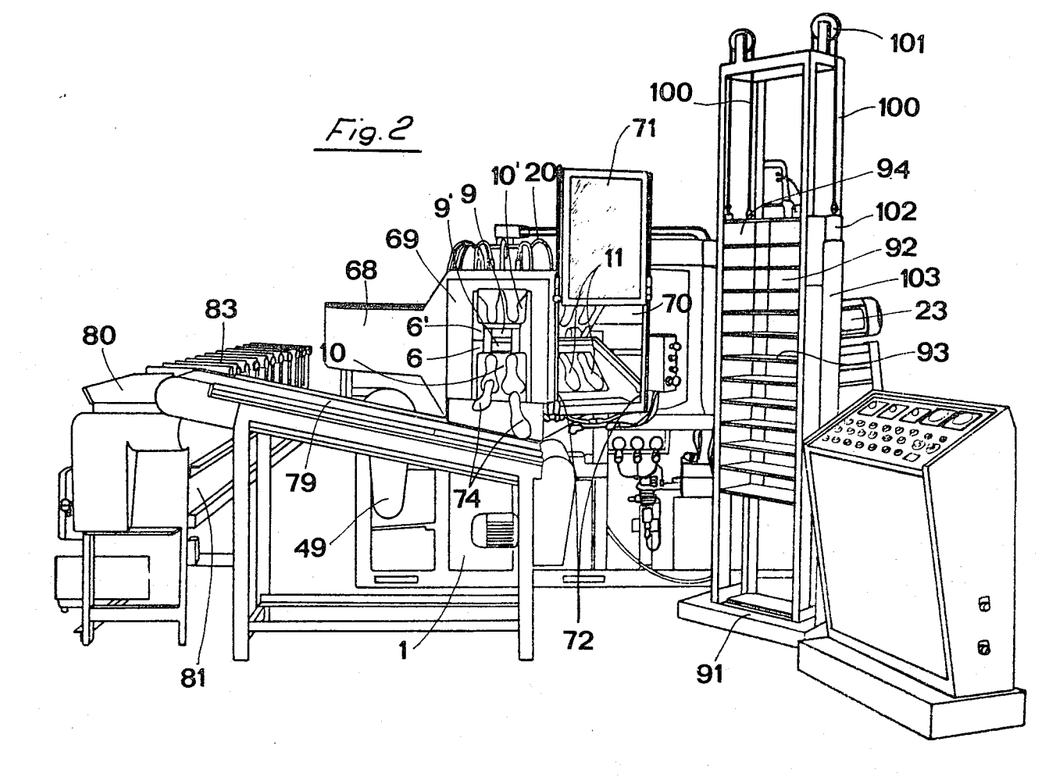
FIG. 2 shows the device in FIG. 1 in a schematical perspective front view.
Figure 3:
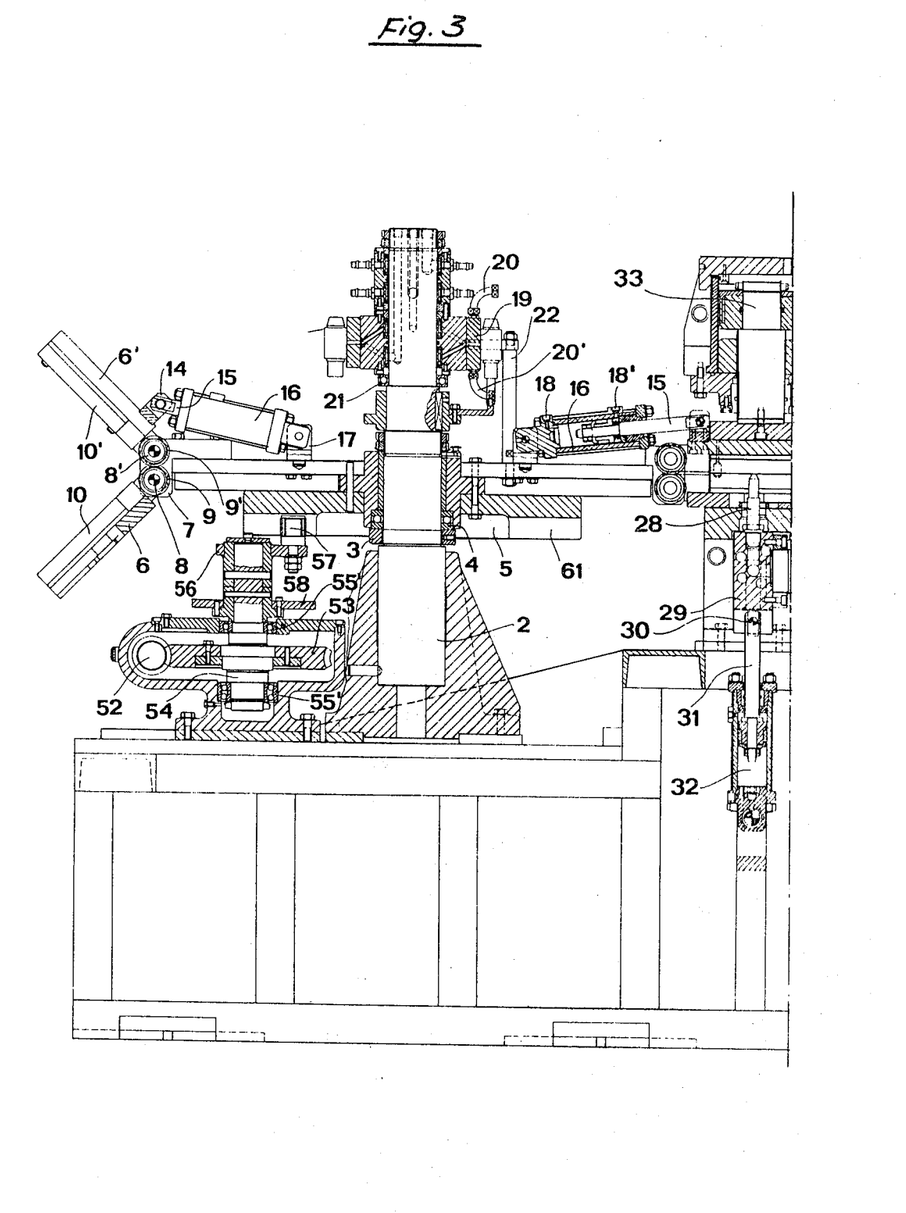
FIG. 3 represents the operating unit of the instant device, consisting of the mould holding rotary table and the injection apparatus in a vertical section.
Figure 4:
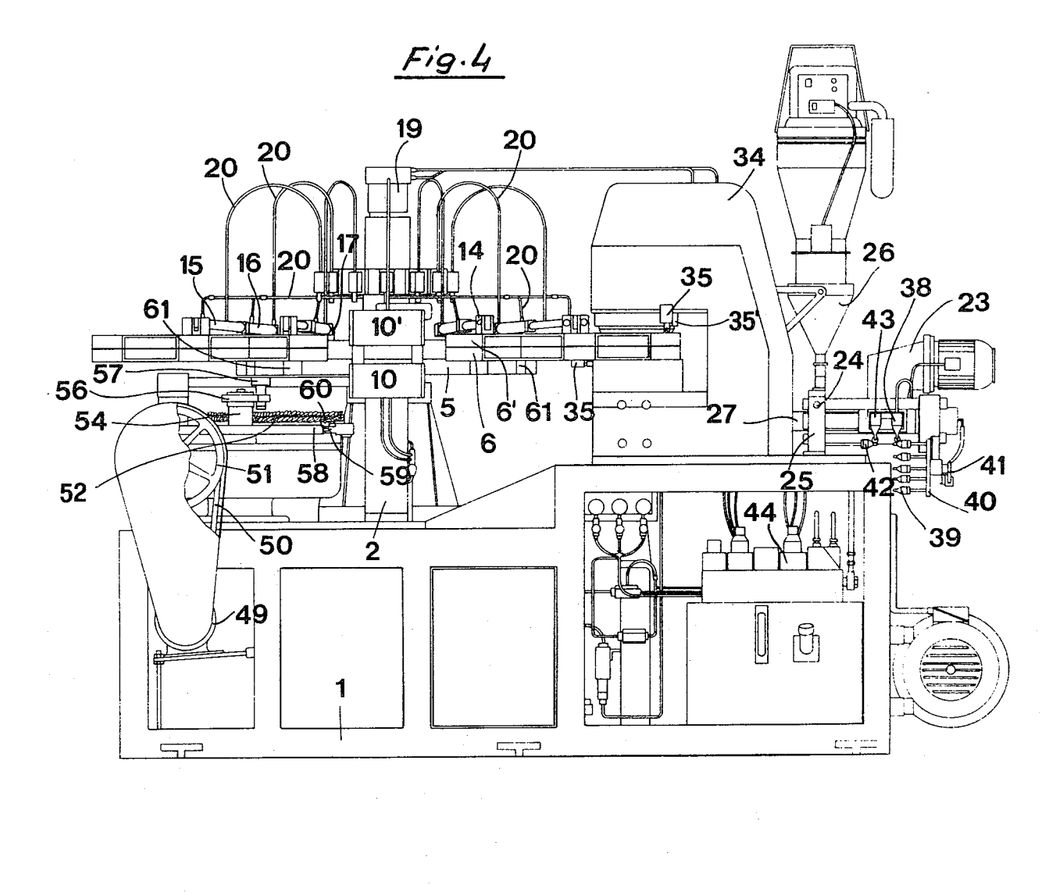
FIG. 4 shows the operating unit in FIG. 3 in a schematical front view.
Figure 5:
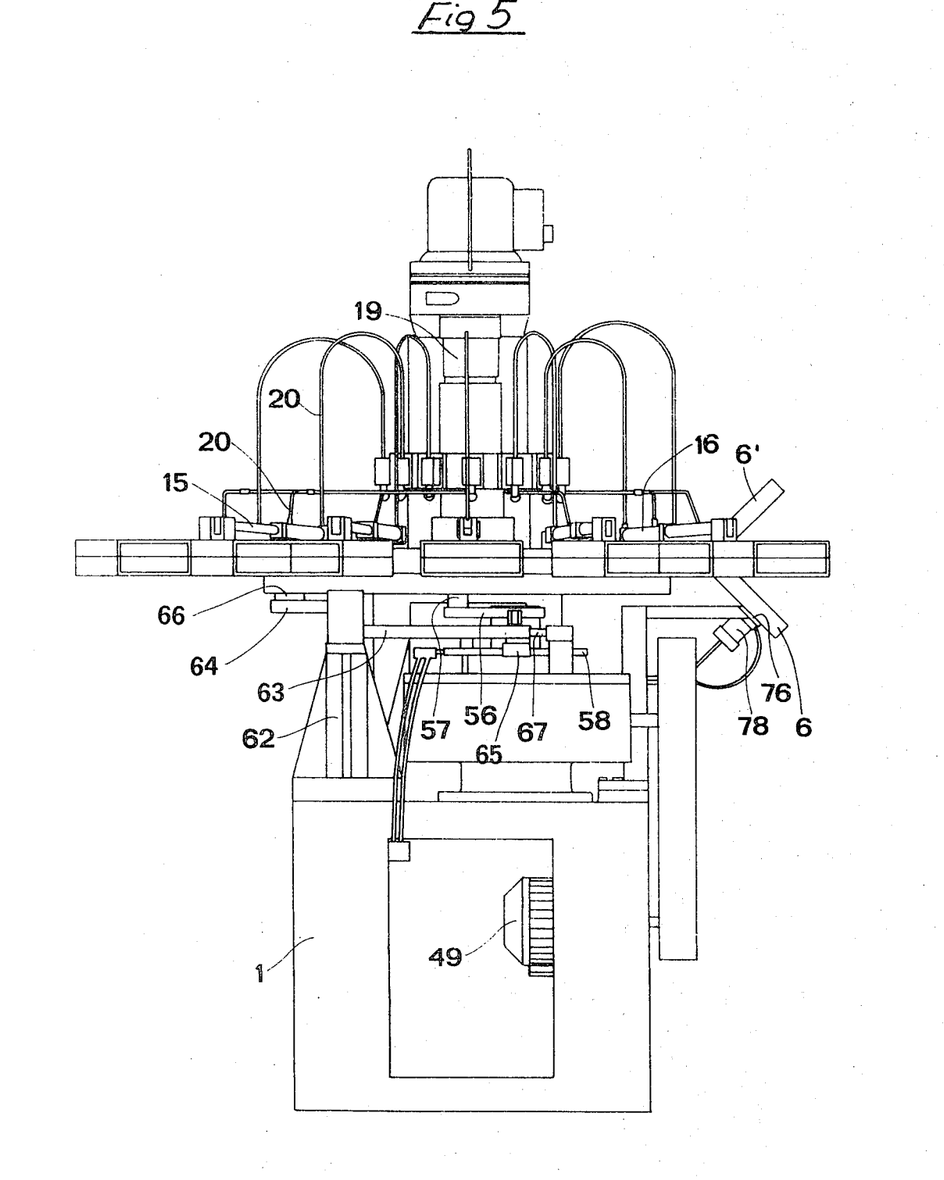
FIG. 5 represents in a schematical form the side view view of the operating unit in FIGS. 3 and 4.

Said injection apparatus 23 is provided with a hopper 26 — see FIG. 4 — with automatic feed, which delivers the granules of thermoplastic synthetic resin to the plasticizing cylinder 27.

From the plasticizing cylinder the material to be injected is pushed through a pair of nozzles 28, mounted on a special nozzle holding head 29.

The aforesaid nozzle holding head is journalled with its lower portion via a pin 30 to the piston 31 of a double acting cylinder 32.

In case on the rotary table 5 there are mounted twelve mould holders, the rotary table itself rotates for each operating cycle one twelvth revolution, placing subsequently each individual mould holder at the pair of nozzles 28.

Said nozzles, the insertion of which into the median hole 12', drilled in the lower part 6 of the mould holder, is controlled by the cylinder 32, inject the molten plastic material into the hollow space, delimited by the two mould halves 10 and 10' and the two edges of the plants 11 and 11'.

During said operation, consequent upon the strength pressure developing inside the mould, the mould holder is maintained in compressed condition from the high by the action of a piston 33, supported by a fork bracket 34, integral with the baseplate 1.

To the structure of said bracket 34 there are fastened two safety devices 35 and 35', controlling the breaking of the forward notion of the rotary table 5 in case of a possible failed closing of the mould holders.

On the bracket 34 further there are placed at its rear column (see FIG. 6) a switch 36, controlling the injection after the positioning of the nozzles 28 and a safety switch 37, controlling forward motion of the rotary table 5, only when the lowering of the nozzle holding head 29 has taken place.

In view of the different dimensions of the series of the moulds mounted on the rotary table 5, the quantity of thermoplastic material to be injected into each mould is controlled by the trip of the limit switch 38, actuated by the rings 39; the latter are being adjusted by displacing them to the right left, thereby proportionating the volume of preplasticized material.

In case the device according to the present invention shows twelve moulds of increasing sizes, the injection apparatus is provided with so many suitably calibrated rings 39, disposed on a disc 40, rotating trip-wise by means of a ratchet, acting on a toothed wheel 41 in compliance with the forward notions of the rotary table 5.

The same injection apparatus 23 is provided further with a stationary ring 42 acting on the limit switch 43, controlling the distributor 44, which actuates the low pressure on the injection end.

Figure 6:
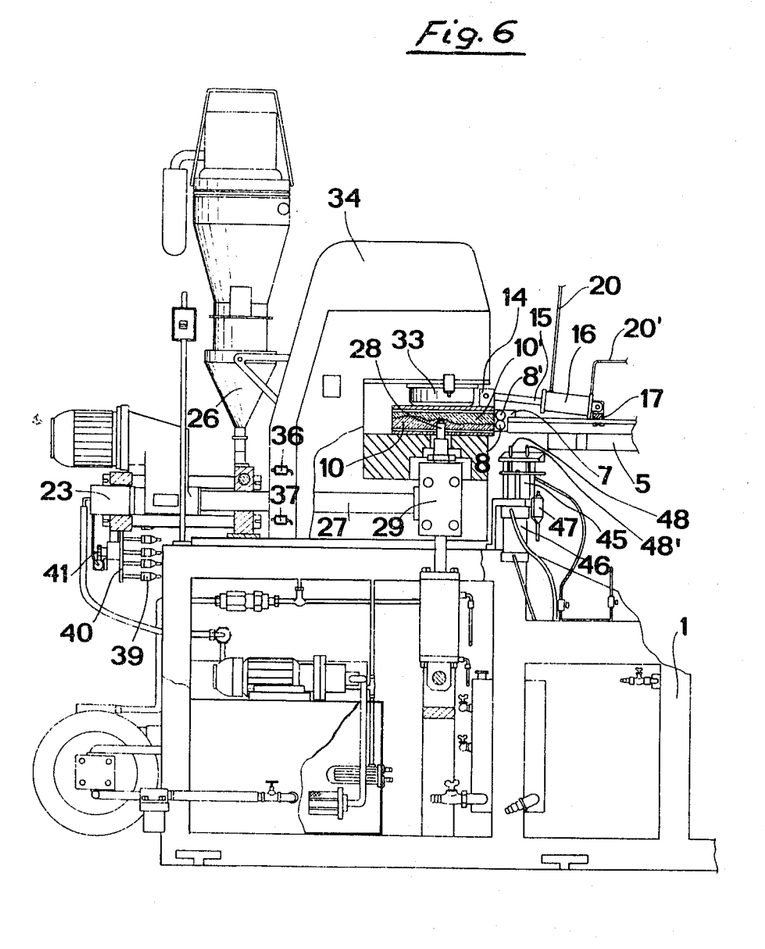
FIG. 6 shows in a schematical form the detail of the injection apparatus.

After the injection of plastic material into a mould has taken place, the rotary table 5 rotates one-twelfth revolution, placing the same mould on a group 45 for stripping the heads (see FIG. 6).

Said heads stripping group 45 is controlled by a cylinder 46 and provided in turn with a switch 47, controlling the return of the strippers 48 and 48' for the heads themselves.

The strip-wise forward motion of the rotary table 5 is determined by the rotation of a self-breaking motor 49, which via a belt 50 drives a pulley 51, keyed at the end of wormgear 52.

Said wormgear 52 rotates a toothed wheel 53, mounted on a vertical shaft 54, supported by a pair of ball bearings 55 and 55'.

With the vertical shaft 54 there is integral an upper horizontal cam 56, provided at one of its peripheric portions with a stake 57, consisting of a roller bearing.

With the same shaft 54 there is integral on the lower portion a second cam 58, also disposed on a horizontal plane, which acts on a switch 59 for the stopping of the rotation of the rotary table 5 and on a push-button 60 the function of which will be dealt with farther.

The aforesaid upper cam 57, which acts as a driving wheel for a Maltese cross mechanism, engages with the stake 57 into the radial slots 61, provided according to a symmetrical arrangement, at each mould holder in the lower face of the rotary table 5.

Figure 10:
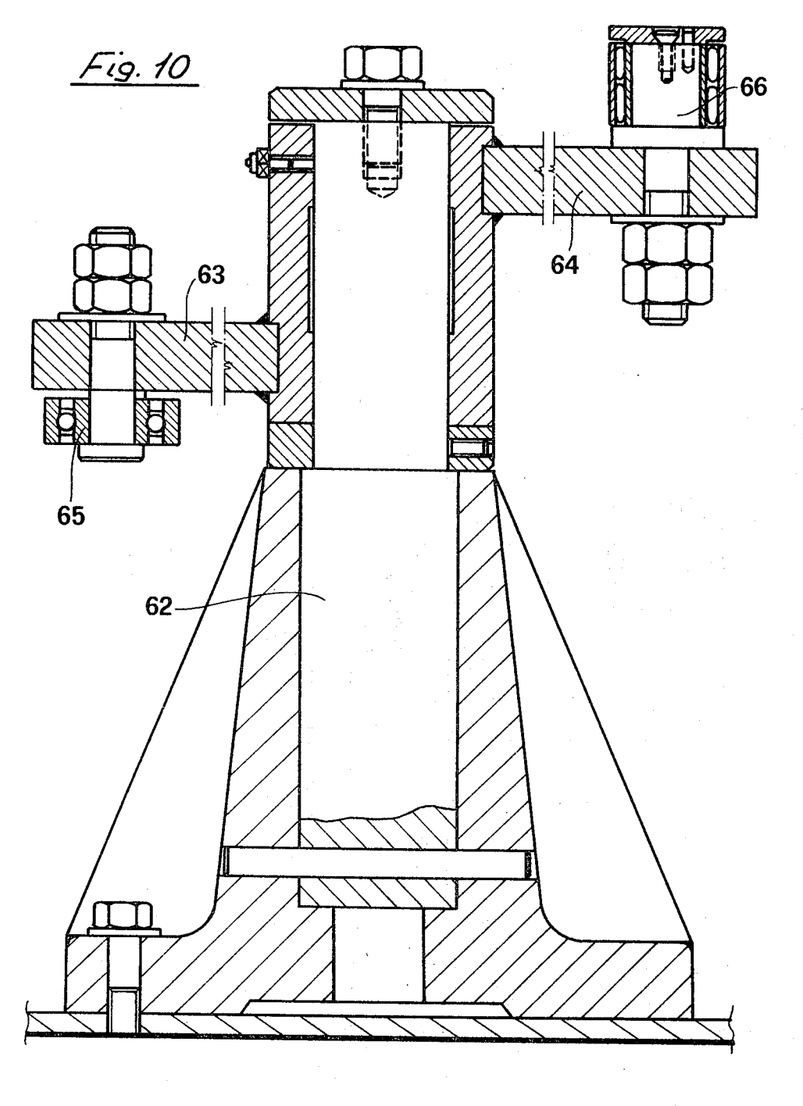
FIG. 10 shows in a schematical form the vertical section of the rotary table positioning unit.

The positioning stability of the rotary table 5 after the stake 57 has disengaged from a slot 61, is ensured by a mechanical group 62, shown in FIG. 10 mounted on the baseplate 1 and provided with two radial arms 63 and 64, disposed at a different height and supporting one two screen ball bearing 65 and one roller bearing 66, respectively.

The ball bearing 65 slides in contact with the lower cam 58, as being retained by a cylindrical tension spring, whilst its support arm 63 may engage with a safety switch 67 for the positioning of the rotary table 5.

The roller bearing 66 instead inserts itself into one of slots 61, obtained on the lower portion of the rotary-table 5 itself, thereby ensuring the stopping of the table itself.

The latter is preferably provided with a case 68, showing two openings 69 and 70, both disposed before the injection apparatus 23.

The opening 70 precedes immediately the aforesaid injection apparatus and therethrough the moulds are loaded, which present themselves open with the pairs of plants 11. Said opening is provided with a safety gate 71 having a pair of proximity switches 72, being suitably located to protect the operator.

The closing of the mould, which may take place only with closed gate, provokes the forward motion of the rotary table 5.

The mould, loaded with the plants, transfers at each subsequent trip of the rotary table 5 at first onto the nozzle holding head 29 and then onto the heads stripping group 45 and subsequently through the other positions until reaching at the room 69, disposed immediately before the room 70.

It should be stressed here that downstream of the heads stripping group 45 there is installed preferably a fan 73 adapted to promote the cooling of the moulds and then the hardening of the molded layers of synthetic resin.

At the opening 69 the mould holder opens due to the action of the cylinder 16 and from the mould is ejected the pair of cork soles 74.

Said ejecting operation is carried out by a pair of strippers 75 and 75', fastened onto a movable plate 76, provided in median position with a displacement guide 77.

The whole is secured to an arm, integral with the baseplate 1.

The aforesaid two strippers and the displacement guide, which are obviously disposed so as to fit into the three through-holes 12, 12' and 12'', drilled in the mould holder and mould, insert themselves into the holes themselves via the movable plate 76, actuated by a double acting cylinder 78.

The pair of cork soles 74, ejected from the mould, fall onto a belt conveyor 79, disposed tangentially of the rotary table 5.

Figure 7:
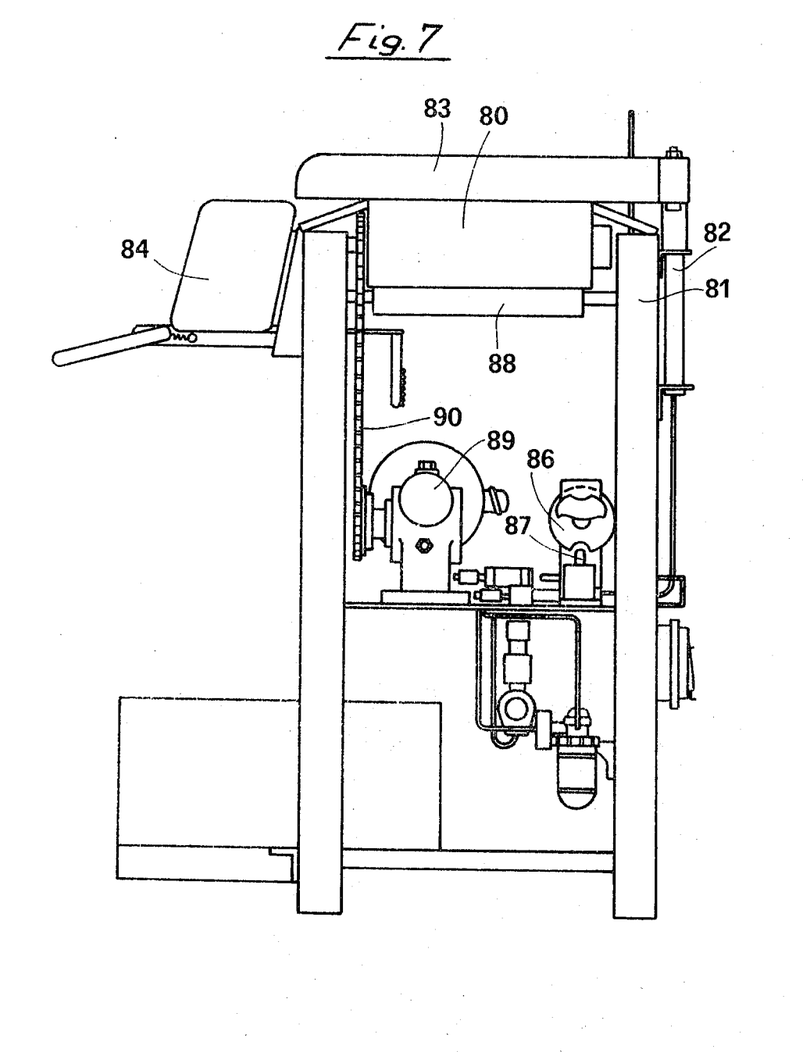
FIG. 7 represents in a schematical form a side view of selecting bent conveyor with which the device of this invention is provided.

Said belt conveyor 79 conveys the cork soles onto a second belt conveyor 80, perpendicular to the former, mounted on a frame 81, which supports, on one of its sides, pneumatic cylinders 82, provided with vertical axis pistons being regularly spaced from each other and provided in a number equal to that of the moulds with which the installation is provided.

With the pistons of said cylinders are integral the rods 83, disposed diagonally relative to the sliding direction of the belt conveyor 80.

On the opposite side of the frame 81 there are instead located at the ends of said rods 83 so many separating members 84, formed by vertical tables of appropriate width and fitted preferably with organs supporting the bags 85 or other similar containers.

The rods 83 are normally elevated relative to the belt conveyor 80 so that the cork soles 74 may pass thereunder.

The same rods, however, lower in a succession order until touching the plan of the belt 80 at each forward motion of the rotary table 5 so as to perform the selection of the various sizes of cork soles.

More accurately, the vertical motion of said rods 83 is controlled by the respective cylinder 82, actuated by the rotation of a series of cams 86, which may act on the push-button 87 of so many pneumatic valves being provided in a number being equal to that of the cylinders themselves.

The rotation of the cams 86 is controlled by a special motor.

The belt conveyor 80 is provided with a series of rollers 88 located on the lower portion and is set in motion by a speed reducer 89 through the drive chain 90.

Figure 8:
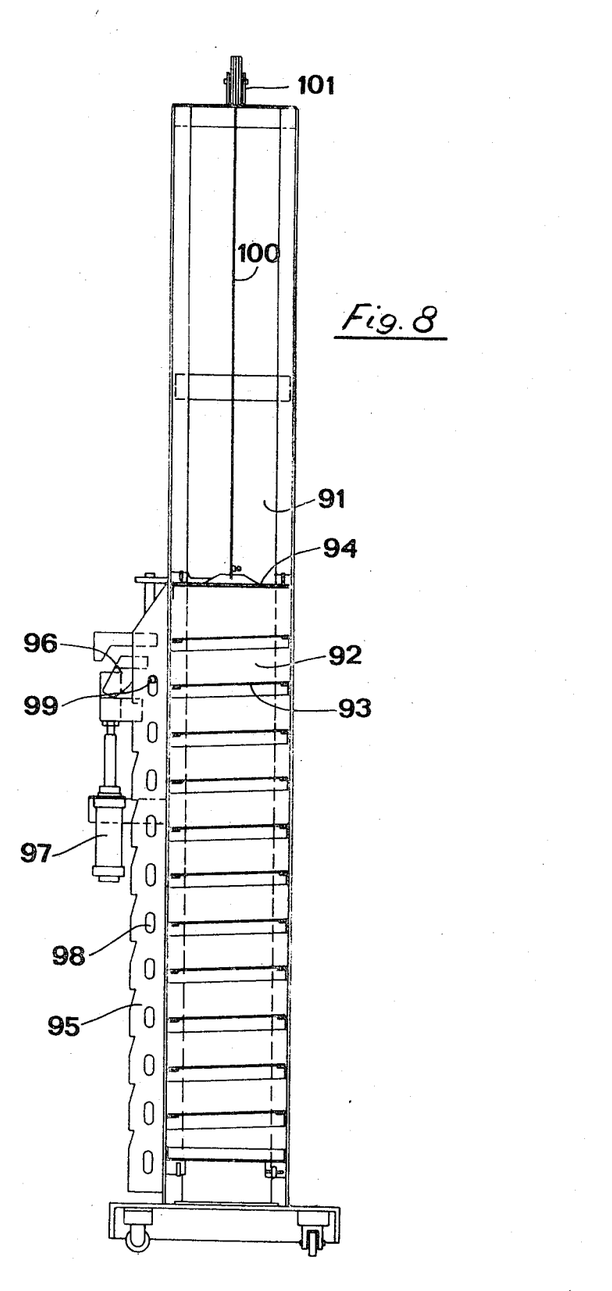
FIG. 8 shows in a schematical view the cross section of the shelf with movable support surfaces to contain the plants.

This installation includes further a shelf 91 for containing the plants 11, subdivided as to their various sizes.

Said shelf is, therefore, provided with a number of rooms 92 corresponding to the number of moulds with which the device itself is fitted.

Said rooms are obtained from a plurality of support surfaces 93, fastened within a container 94, which may slide along the columns of the shelf 91 itself.

Said container 94 is provided at its rear portion with a vertical rack 95 against the teeth of which engages a pawl 90, actuated by a pneumatic cylinder 97.

The aforementioned rack 95 is provided at each of its teeth — which are provided in a number corresponding to that of the support surfaces 93 — with a through-opening 98, into which fits in at each trip of the pawl 96 a check piston 99.

The same container 94 is connected via steel cables 100 passing on the back gear pulleys 101, to two weights 102, sliding within tubular protection members 103.

It should be stated here that the trip-wise motion of the container takes place simultaneously with the forward motions of the rotary table 5, the cylinder 97 being actuated by the push-button 60 via the cam 58.

Said cam actuates the push-button 60 at each revolution.

The said container 94 or the structure of the shelf 91, along which slides the container itself, is provided with a limit switch, adapted to return the container itself after each cycle — namely after each full revolution of the rotary table 5 — to its starting position.

From the foregoing and from perusal of the various figures on the accompanying drawings one may easily see the great functional character and practical application of the device for continuous production of cork soles for footwears according to this invention.

Said device has been described by making reference to the accompanying figures, representing a preferred but non limiting embodiment form given by way of example.

Several changes and modifications may be obviously introduced in the device of this invention as to shape, dimensions and construction, without departing from the scope of this invention.

What is claimed is:

1. Device for continuous half-automatic production of cork soles for footwears, provided with a core consisting of thermoplastic material, obtained by injection of thermoplastic material, obtained by injection of thermoplastic material between the two edges of the plant, wherein there are provided:
    a. a table of circular configuration, rotating trip-wise about its axis and on the edge of which there are journalled, radially and movable mould holders, consisting of two rectangular structures, in each of which there are placed the two halves of a mould having the shape of the plant to be reproduced, the lower structure of the mould and mould holder being provided axially with three through-holes the median hole of which is slightly projecting from the plane of the mould for the fastening therein of the opening arranged on the lower edge of the plant, whilst the upper structure of the mould holder is connected to the piston of a double acting cylinder, determining the opening and the closing of the mould holder itself;
    b. an injection apparatus, disposed sideways of the rotary table, and including a hopper, a plasticizing cylinder and a pair of nozzles mounted on a nozzle holding head, journalled to the piston of a vertical double acting cylinder;
    c. an apparatus for the regulation of the quantity of thermoplastic material to be injected in the two edges of the plant, consisting of a disc rotating trip-wise in compliance with the rotary table and provided with so many rings as the moulds being adjustable, said rings actuating a limit switch disposed at one end, whilst the opposite limit swith is actuated by a stationary ring;
    d. an apparatus for stripping some heads comprising a double acting cylinder, connected to strippers and a switch controlling the return of said strippers;
    e. an apparatus for the ejection of the obtained cork soles, disposed before the injection apparatus and at the opening of the mould holder and including a pair of strippers fastened onto a movable plate, actuated by a double acting cylinder and coinciding with the three through-holes, drilled in the lower portion of the mould and mould holder;
    f. a belt conveyor, selecting the various sizes of the plants, distribution them in the containers, and
    g. a shelf containing some plants, subdivided according to the various sizes and the support surfaces of which are moved trip-wise in compliance with the rotation of the table.

2. Device as defined in claim 1, wherein the stripwise forward motion of the rotary table is determined by a selfbraking motor, which, via a chain and a worm-gear, rotates a toothed wheel mounted on a vertical shaft, with which there are integral an upper horizontal cam, provided at its peripheric portion with a stake, engaging into the radial slots obtained in the lower face of the rotary table at each mould holder, and a lower horizontal cam, acting on two switches one of which stops the rotation of the table and the other one actuates the trip-wise motion of the support surfaces of the shelf as per point (g).

3. Device as defined in claim 1, wherein the table positioning stability is ensured by a mechanical group, fitted with two radial arms, disposed at a different height, and supporting respectively a two screen ball bearing and a roller bearing, the former sliding in contact with the lower horizontal cam and its support arm engages with a switch, and the latter inserting itself into one of the slots, formed on the lower portion of the rotary table.

4. Device as defined in claim 1, wherein the rotary table is provided with a case, having two openings disposed both before the injection apparatus and the one most close to said injection apparatus of which is provide with a safety gate, fitted with proximity switches, and therethrough the moulds are being loaded, the opening being most remote from said injection apparatus serving for the unloading of the plants.

5. Device as defined in claim 1, wherein during the injection operation the mould holder is maintained closed and compressed by means of a piston, acting on the upper portion of the mould holder itself.

6. Device as defined in claim 1, characterized in that is provided with a fan, disposed downstream of the heads stripping apparatus.

7. Device as defined in claim 1, wherein the belt conveyor is provided on the superior portion with rods in a number being equal to that of the moulds and disposed diagonally relative to the sliding direction of the belt conveyor, said rods being journalled at one end to the piston of so many vertical pneumatic cylinders, controlled by same, rotating in compliance with the rotary table, and at the other end to vertical separators, provided with containers support organs.

8. Device as defined in claim 1, wherein the shelf containing the plants consist of a number of rooms equal to that of the moulds, said rooms being delimited by support surfaces, fastened inside a container, which may slide along the columns of the shelf by means of a pneumatic cylinder, actuated by the push-button of the lower cam of the vertical shaft of the rotary table and acting on the container via a pawl, engaging into the teeth of a vertical rack, disposed in the rear portion of said shelf.

9. Device as defined in claim 8, wherein the shelf or the container is provided with a limit switch which after each full revolution of the table returns the container to its starting position.

* * * * *